US011648669B2

(12) United States Patent
Johnson et al.

(10) Patent No.: US 11,648,669 B2
(45) Date of Patent: May 16, 2023

(54) ONE-CLICK ROBOT ORDER

(71) Applicant: The Charles Stark Draper Laboratory, Inc., Cambridge, MA (US)

(72) Inventors: David M. S. Johnson, Cambridge, MA (US); Syler Wagner, Somerville, MA (US); Steven Lines, Brookline, MA (US); Cody Chu, Somerville, MA (US); Anthony Tayoun, Cambridge, MA (US); Mitchell Hebert, Littleton, CO (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 83 days.

(21) Appl. No.: 16/571,041

(22) Filed: Sep. 13, 2019

(65) Prior Publication Data

US 2020/0087069 A1    Mar. 19, 2020

Related U.S. Application Data

(60) Provisional application No. 62/731,398, filed on Sep. 14, 2018, provisional application No. 62/730,918, (Continued)

(51) Int. Cl.
*B25J 9/16* (2006.01)
*B25J 13/00* (2006.01)
(Continued)

(52) U.S. Cl.
CPC .......... *B25J 9/1666* (2013.01); *B25J 9/0009* (2013.01); *B25J 9/16* (2013.01); *B25J 9/161* (2013.01);
(Continued)

(58) Field of Classification Search
CPC combination set(s) only.
See application file for complete search history.

(56) References Cited

U.S. PATENT DOCUMENTS 4,512,709 A    4/1985    Hennekes
4,513,709 A    4/1985    Hennekes
(Continued)

FOREIGN PATENT DOCUMENTS

CN    106313068 A    1/2017
CN    107092209 A    8/2017
(Continued)

OTHER PUBLICATIONS

Anandan, T.M., "The Shrinking Footprint of Robot Safety", Robotics Online, Oct. 6, 2014. https://www.robotics.org/content-detail.cfm/Industrial-Robotics-Industry-Insights/The-Shrinking-Footprint-of-Robot-Safety/content_id/5059.
(Continued)

*Primary Examiner* — Kyle O Logan
(74) *Attorney, Agent, or Firm* — Hamilton, Brook, Smith & Reynolds P.C.

(57) ABSTRACT

In an embodiment, a method for handling an order includes determining a plurality of ingredients based on an order, received from a user over a network, for a location having a plurality of robots. The method further includes planning at least one trajectory for at least one robot based on the plurality of ingredients and utensils available at the location, and proximity of each ingredient and utensil to the at least one robot. Each trajectory can be configured to move one of the plurality of ingredients into a container associated with the order. In an embodiment, the method includes executing the at least one trajectory by the at least one robot to fulfill the order. In an embodiment, the method includes moving the container to a pickup area.

14 Claims, 6 Drawing Sheets

Related U.S. Application Data filed on Sep. 13, 2018, provisional application No. 62/730,934, filed on Sep. 13, 2018, provisional application No. 62/730,947, filed on Sep. 13, 2018, provisional application No. 62/730,933, filed on Sep. 13, 2018, provisional application No. 62/730,703, filed on Sep. 13, 2018.

(51) Int. Cl.
<table>
<tr><td>B25J 13/08</td><td>(2006.01)</td></tr>
<tr><td>G06N 3/08</td><td>(2023.01)</td></tr>
<tr><td>G10L 15/22</td><td>(2006.01)</td></tr>
<tr><td>B65G 1/137</td><td>(2006.01)</td></tr>
<tr><td>B25J 9/00</td><td>(2006.01)</td></tr>
<tr><td>B25J 15/00</td><td>(2006.01)</td></tr>
<tr><td>G06Q 10/0631</td><td>(2023.01)</td></tr>
<tr><td>B25J 11/00</td><td>(2006.01)</td></tr>
<tr><td>B25J 15/04</td><td>(2006.01)</td></tr>
<tr><td>B25J 19/02</td><td>(2006.01)</td></tr>
<tr><td>G05D 1/02</td><td>(2020.01)</td></tr>
<tr><td>B25J 19/00</td><td>(2006.01)</td></tr>
<tr><td>G06V 40/20</td><td>(2022.01)</td></tr>
<tr><td>H04L 67/12</td><td>(2022.01)</td></tr>
<tr><td>G05B 19/4061</td><td>(2006.01)</td></tr>
<tr><td>A47J 44/00</td><td>(2006.01)</td></tr>
</table>

(52) U.S. Cl.
CPC ........... *B25J 9/1633* (2013.01); *B25J 9/1653* (2013.01); *B25J 9/1664* (2013.01); *B25J 9/1674* (2013.01); *B25J 9/1676* (2013.01); *B25J 9/1682* (2013.01); *B25J 9/1687* (2013.01); *B25J 9/1697* (2013.01); *B25J 11/0045* (2013.01); *B25J 13/003* (2013.01); *B25J 13/085* (2013.01); *B25J 13/088* (2013.01); *B25J 15/0052* (2013.01); *B25J 15/0408* (2013.01); *B25J 19/0083* (2013.01); *B25J 19/023* (2013.01); *B65G 1/137* (2013.01); *G05D 1/02* (2013.01); *G06N 3/08* (2013.01); *G06Q 10/06316* (2013.01); *G06V 40/28* (2022.01); *G10L 15/22* (2013.01); *A47J 44/00* (2013.01); *G05B 19/4061* (2013.01); *G05B 2219/32335* (2013.01); *G05B 2219/39001* (2013.01); *G05B 2219/39091* (2013.01); *G05B 2219/39319* (2013.01); *G05B 2219/39342* (2013.01); *G05B 2219/39468* (2013.01); *G05B 2219/40201* (2013.01); *G05B 2219/40202* (2013.01); *G05B 2219/40411* (2013.01); *G05B 2219/40497* (2013.01); *G05B 2219/45111* (2013.01); *G05B 2219/49157* (2013.01); *G05B 2219/50391* (2013.01); *H04L 67/12* (2013.01)

(56) References Cited

U.S. PATENT DOCUMENTS

| | | |
|---|---|---|
| 4,604,787 A | 8/1986 | Silvers |
| 4,611,377 A | 9/1986 | McCormick |
| 4,624,043 A | 11/1986 | Bennett |
| 4,676,142 A | 6/1987 | McCormick |
| 4,875,275 A | 10/1989 | Hutchinson et al. |
| 4,896,357 A | 1/1990 | Hatano |
| 4,904,514 A | 2/1990 | Morrison et al. |
| 5,018,266 A | 5/1991 | Hutchinson et al. |
| 5,044,063 A | 9/1991 | Voellmer |
| 5,131,706 A | 7/1992 | Appleberry |
| 5,136,223 A | 8/1992 | Karakama |
| 5,360,249 A | 11/1994 | Monforte et al. |
| 5,396,346 A | 3/1995 | Nakayama |
| 5,774,841 A | 6/1998 | Salazar et al. |
| 5,879,277 A | 3/1999 | Dettman et al. |
| 6,223,110 B1 | 4/2001 | Rowe et al. |
| 6,427,995 B1 | 8/2002 | Steinwall |
| 6,569,070 B1 | 5/2003 | Harrington et al. |
| 6,678,572 B1 | 1/2004 | Oh |
| 8,095,237 B2 | 1/2012 | Habibi et al. |
| 9,186,795 B1 | 11/2015 | Edsinger et al. |
| 9,189,742 B2 | 11/2015 | London |
| 9,259,840 B1 | 2/2016 | Chen |
| 9,346,164 B1 | 5/2016 | Edsinger et al. |
| 9,427,876 B2 | 8/2016 | Mozeika et al. |
| 9,615,066 B1 | 4/2017 | Tran et al. |
| 9,621,984 B1 | 4/2017 | Chu |
| 9,659,225 B2 | 5/2017 | Joshi et al. |
| 9,744,668 B1 | 8/2017 | Russell et al. |
| 9,547,306 B2 | 10/2017 | Sepulveda |
| 9,800,973 B1 | 10/2017 | Chatot et al. |
| 9,801,517 B2 | 10/2017 | High et al. |
| 10,131,053 B1 | 11/2018 | Sampedro et al. |
| 10,427,306 B1 | 10/2019 | Quinlan et al. |
| 11,016,491 B1 | 5/2021 | Millard |
| 11,116,593 B2 | 9/2021 | Hashimoto et al. |
| 11,351,673 B2 | 6/2022 | Zito et al. |
| 2002/0144565 A1 | 10/2002 | Ambrose |
| 2002/0151848 A1 | 10/2002 | Capote et al. |
| 2002/0158599 A1 | 10/2002 | Fujita |
| 2002/0181773 A1 | 12/2002 | Higaki et al. |
| 2003/0060930 A1 | 3/2003 | Fujita |
| 2004/0039483 A1 | 2/2004 | Kemp et al. |
| 2004/0172380 A1 | 9/2004 | Zhang et al. |
| 2005/0004710 A1 | 1/2005 | Shimomura et al. |
| 2005/0193901 A1 | 6/2005 | Buehler |
| 2005/0171643 A1 | 8/2005 | Sabe et al. |
| 2005/0283475 A1 | 12/2005 | Beranik |
| 2006/0137164 A1 | 6/2006 | Kraus |
| 2006/0141200 A1 | 6/2006 | D'Amdreta |
| 2006/0165953 A1 | 7/2006 | Castelli |
| 2007/0233321 A1 | 10/2007 | Suzuki |
| 2007/0274812 A1 | 11/2007 | Ban et al. |
| 2007/0276539 A1 | 11/2007 | Habibi et al. |
| 2008/0059178 A1 | 3/2008 | Yamamoto et al. |
| 2008/0161970 A1 | 7/2008 | Adachi et al. |
| 2008/0177421 A1 | 7/2008 | Cheng et al. |
| 2008/0201016 A1 | 8/2008 | Finlay |
| 2008/0237921 A1 | 10/2008 | Butterworth |
| 2009/0075796 A1 | 3/2009 | Doll |
| 2009/0292298 A1 | 11/2009 | Lin et al. |
| 2010/0114371 A1 | 5/2010 | Tsusaka et al. |
| 2010/0292707 A1 | 11/2010 | Ortmaier |
| 2011/0060462 A1 | 3/2011 | Aurnhammer et al. |
| 2011/0125504 A1 | 5/2011 | Ko et al. |
| 2011/0238212 A1 | 9/2011 | Shirado et al. |
| 2011/0256995 A1 | 10/2011 | Takazakura et al. |
| 2012/0016678 A1 | 1/2012 | Gruber |
| 2012/0255388 A1 | 10/2012 | McClosky |
| 2012/0290134 A1 | 11/2012 | Zhao et al. |
| 2013/0079930 A1 | 3/2013 | Mistry |
| 2013/0103198 A1 | 4/2013 | Nakamoto et al. |
| 2013/0103918 A1 | 4/2013 | Dictos |
| 2014/0067121 A1 | 3/2014 | Brooks |
| 2014/0163736 A1 | 6/2014 | Azizian et al. |
| 2014/0316636 A1 | 10/2014 | Hong et al. |
| 2015/0032260 A1 | 1/2015 | Yoon et al. |
| 2015/0051734 A1 | 2/2015 | Zheng |
| 2015/0052703 A1 | 2/2015 | Lee et al. |
| 2015/0114236 A1 | 4/2015 | Roy |
| 2015/0117156 A1 | 4/2015 | Xu et al. |
| 2015/0148953 A1 | 5/2015 | Laurent et al. |
| 2015/0149175 A1 | 5/2015 | Hirata et al. |
| 2015/0178953 A1 | 5/2015 | Laurent |
| 2015/0277430 A1 | 10/2015 | Linnell et al. |
| 2015/0375402 A1 | 12/2015 | D Andreta |
| 2016/0016315 A1 | 1/2016 | Kuffner et al. |
| 2016/0073644 A1 | 3/2016 | Dickey |
| 2016/0075023 A1 | 3/2016 | Sisbot |
| 2016/0103202 A1 | 4/2016 | Sumiyoshi et al. |
| 2016/0291571 A1 | 10/2016 | Cristiano |
| 2016/0372138 A1 | 12/2016 | Shinkai et al. |

(56) References Cited

U.S. PATENT DOCUMENTS

| | | |
|---|---|---|
| 2017/0004406 A1 | 1/2017 | Aghamohammadi |
| 2017/0080565 A1 | 3/2017 | Dalibard |
| 2017/0087722 A1 | 3/2017 | Aberg et al. |
| 2017/0133009 A1 | 5/2017 | Cho et al. |
| 2017/0168488 A1 | 6/2017 | Wierzynski |
| 2017/0178352 A1 | 6/2017 | Harmsen et al. |
| 2017/0326728 A1 | 11/2017 | Prats |
| 2017/0334066 A1 | 11/2017 | Levine |
| 2017/0354294 A1 | 12/2017 | Shivaiah |
| 2017/0361461 A1 | 12/2017 | Tan |
| 2017/0361468 A1 | 12/2017 | Cheuvront et al. |
| 2018/0043952 A1 | 2/2018 | Ellerman et al. |
| 2018/0056520 A1 | 3/2018 | Ozaki |
| 2018/0070776 A1 | 3/2018 | Ganninger |
| 2018/0121994 A1* | 5/2018 | Matsunaga ......... G06F 16/9537 |
| 2018/0144244 A1 | 5/2018 | Masoud et al. |
| 2018/0147718 A1* | 5/2018 | Oleynik ................. G05B 19/42 |
| 2018/0147723 A1 | 5/2018 | Vijayanarasimhan |
| 2018/0150661 A1 | 5/2018 | Hall et al. |
| 2018/0200014 A1 | 7/2018 | Bonny et al. |
| 2018/0200885 A1 | 7/2018 | Ikeda et al. |
| 2018/0202819 A1 | 7/2018 | Mital |
| 2018/0214221 A1 | 8/2018 | Crawford et al. |
| 2018/0257221 A1 | 9/2018 | Toothaker et al. |
| 2018/0275632 A1 | 9/2018 | Zhang et al. |
| 2018/0338504 A1 | 11/2018 | Lavri et al. |
| 2018/0345479 A1 | 12/2018 | Martino et al. |
| 2018/0348783 A1 | 12/2018 | Pitzer et al. |
| 2018/0354140 A1 | 12/2018 | Watanabe |
| 2019/0001489 A1 | 1/2019 | Hudson et al. |
| 2019/0039241 A1 | 2/2019 | Langenfeld et al. |
| 2019/0049970 A1 | 2/2019 | Djuric et al. |
| 2019/0056751 A1 | 2/2019 | Ferguson et al. |
| 2019/0066680 A1 | 2/2019 | Woo et al. |
| 2019/0212441 A1 | 7/2019 | Casner et al. |
| 2019/0291277 A1 | 9/2019 | Oleynik |
| 2019/0310611 A1 | 10/2019 | Jain |
| 2019/0321989 A1 | 10/2019 | Anderson et al. |
| 2019/0381617 A1 | 12/2019 | Patrini et al. |
| 2020/0023520 A1 | 1/2020 | Yoshizumi |
| 2020/0030966 A1 | 1/2020 | Hasegawa |
| 2020/0047349 A1 | 2/2020 | Sinnet et al. |
| 2020/0073358 A1 | 3/2020 | Dedkov et al. |
| 2020/0073367 A1 | 3/2020 | Nguyen et al. |
| 2020/0086437 A1 | 3/2020 | Johnson |
| 2020/0086482 A1 | 3/2020 | Johnson |
| 2020/0086485 A1 | 3/2020 | Johnson |
| 2020/0086487 A1 | 3/2020 | Johnson |
| 2020/0086497 A1 | 3/2020 | Johnson |
| 2020/0086498 A1 | 3/2020 | Johnson |
| 2020/0086502 A1 | 3/2020 | Johnson |
| 2020/0086503 A1 | 3/2020 | Johnson |
| 2020/0086509 A1 | 3/2020 | Johnson |
| 2020/0090099 A1 | 3/2020 | Johnson |
| 2020/0070355 A1 | 4/2020 | Neumann et al. |
| 2020/0298403 A1 | 9/2020 | Nilsson et al. |
| 2022/0066456 A1 | 3/2022 | Ebrahimi et al. |

FOREIGN PATENT DOCUMENTS

| | | |
|---|---|---|
| DE | 3723329 A | 1/1988 |
| DE | 3823102 A1 | 1/1990 |
| EP | 138461 A2 | 4/1985 |
| EP | 474881 A1 | 3/1992 |
| EP | 1145804 A1 | 10/2001 |
| EP | 2011610 A2 | 1/2019 |
| FR | 3015334 A | 6/2015 |
| GB | 2550396 A | 11/2017 |
| JP | 2004295620 | 10/2004 |
| JP | 200849462 A | 3/2008 |
| JP | 2020028957 | 2/2020 |
| WO | 99/03653 A1 | 1/1999 |
| WO | 2005072917 A1 | 11/2005 |
| WO | 2009045827 A2 | 4/2009 |
| WO | 20150117156 A | 8/2015 |
| WO | 20170197170 A1 | 11/2017 |
| WO | 20180133861 A1 | 7/2018 |
| WO | 2020056279 A1 | 3/2020 |
| WO | 2020056295 A1 | 3/2020 |
| WO | 2020056301 A1 | 3/2020 |
| WO | 2020056353 A1 | 3/2020 |
| WO | 2020056362 A1 | 3/2020 |
| WO | 2020056373 A1 | 3/2020 |
| WO | 2020056374 A1 | 3/2020 |
| WO | 2020056375 A1 | 3/2020 |
| WO | 2020056376 A1 | 3/2020 |
| WO | 2020056377 A1 | 3/2020 |
| WO | 2020056380 A1 | 3/2020 |

OTHER PUBLICATIONS

Blutinger, J., et al., "Scoop: Automating the Ice Cream Scooping Process", Introduction to Robotics MECE E4602, Group 8 Final Project, Dec. 2016.

Bollini, M., et al., "Interpreting and Executing Recipes with a Cooking Robot", Experimental Robotics, 2013.

Cao, Z., et al. "Realtime Multi-Person 2D Pose Estimation using Part Affinity Fields", Proceedings of the IEEE Conference on Computer Vision and Pattern Recognition. 2017.

Dantam, N.T., et al. "Incremental Task and Motion Planning" A Constraint-Based Approach, Robotics: Science and Systems 12, 00052, 2016.

Ferrer-Mestres, J., et al., "Combined Task and Motion Planning as a Classical AI Planning" arXiv preprint arXiv:1706 06927, 2017—arxiv.org; Jun. 21, 2017.

Kaelbling, L.P., et al., "Integrated task and motion planning in beliefs space" The International Journal of Robotics Research; 0(0) 1-34; 2013.

Martinez, J., et al., "On human motion prediction using recurrent neural networks." Proceedings of the IEEE Conference on Computer Vision and Pattern Recognition. 2017.

Nedunuri, S., et al., "SMT-Based Synthesis of Integrated Task and Motion Plan from Plan Outlines"; the Proceedings of the 2014 IEEE Intl. Conf. on Robotics and Automation (ICRA2014).

Saxena, A., et al., "RoboBrain: Large-Scale Knowledge Engine for Robots", arXiv preprint arXiv:1412.0691 (2014).

Schenck, C., et al., "Learning Robotic Manipulation of Granular Media", 1st Conference on Robot Learning, arXiv:1709.02833, Oct. 25, 2017.

Shimizu, T. and Kubota, T., "Advanced Sampling Scheme Based on Environmental Stiffness for a Smart Manipulator", Robot Intelligence Technology and Applications, pp. 19-208. 2012.

Srivastava, S., et al. "Combined Task and Motion Planning Through an Extensible Planner-Independent Interface Layer"; 2014 IEEE international conference on robotics and automation (ICRA), 639-646.

Stentz, A., et al., "A Robotic Excavator for Autonomous Truck Loading", In Proceedings of the IEEE/RSJ International Conference on Intelligent Robotic Systems, 1998.

Villegas, et al., "Learning to Generate Long-term Future via Hierarchical Prediction", In Proceedings of the 34th International Conference on Machine Learning (ICML), 2017.

Walker, J., et al., "The pose knows: Video forecasting by generating pose futures", In The IEEE International Conference on Computer Vision (ICCV), Oct. 2017.

Watson, J,. Kevin, et al. "Use of Voice Recognition for Control of a Robotic Welding Workcell", IEEE Control Systems Magazine; p. 16-18; (ISSN 0272-1708); 7 , Jun. 1, 1987.

Wong, J.M., et al., "SegICP-DSR: Dense Semantic Scene Reconstruction and Registration", Draper, arXiv:1711.02216; Nov. 6, 2017.

Wong, J.M., et al., "SegICP: Integrated Deep Semantic Segmentation and Pose Estimation", Massachusetts Institute of Technology, 2017 IEEE/RSJ International Conference on Intelligent Robots and Systems (IROS); Sep. 5, 2017.

Wu, J., et al., "Real-Time Object Pose Estimation with Pose Interpreter Networks", IEEE/RSJ International Conference on Intelligent Robots and Systems (IROS), 2018.

(56) References Cited

OTHER PUBLICATIONS

Ye, G., et al., "Demonstration-Guided Motion Planning" Robotics Research. Springer Tracts in Advanced Robotics, vol. 100, 2017.
International Search Report and Written Opinion for PCT/US2019/051148 dated Dec. 12, 2019 entitled "Food-Safe, Washable, Thermally-Conductive Robot Cover".
Anonymous: "Pate a pizza fine—Notre recette avec photos—Meilleur du Chef," Retrieved from the Internet: URL https://www.meilleurduchef.com/fr/recette/pate-pizza-fine.html# [retrieved on Dec. 5, 2019].
International Search Report and Written Opinion for PCT/US2019/051176 dated Dec. 12, 2019 entitled "Determining How to Assemble a Meal".
International Search Report and Written Opinion for PCT/US2019/051175 dated Jan. 3, 2020 entitled Stopping Robot Motion Based on Sound Cues.
Dexai Robotics: "Alfred Sous-Chef scooping ice-cream" Youtube, retrieved from Internet Jun. 8, 2018. https://www.youtube.com/watch?v=caNG4qrZhRU.
International Search Report and Written Opinion for PCT/US2019/051179 dated Jan. 9, 2020 entitled "An Adaptor for Food-Safe, Bin-Compatible, Washable, Tool-Changer Utensils".
International Search Report and Written Opinion for PCT/US2019/051177 dated Jan. 9, 2020 entitled "Voice Modification to Robot Motion Plans".
International Search Report and Written Opinino for PCT/US2019/051183 dated Jan. 14, 2020 entitled "Locating and Attaching Interchangeable Tools In-Situ".
International Search Report and Written Opinion for PCT/US2019/051161 dated Jan. 15, 2020 entitled "Food-Safe, Washable Interface for Exchanging Tools".
ATI Industrial Automation: Automatic/RoboticTool Changers, "Automatic/RoboticTool Changes", Tool Changer News. Downloaded from Internet Feb. 4, 2020. https://www.ati-ia.com/products/toolchanger/robot_tool_changer.aspx.
Dexai Robotics: "A Robot Company is Born", retrieved from Internet from Feb. 5, 2020. https://draper.com/dexai-robotics.
Draper—"A 'Preceptive Robot' Earns Draper Spots as KUKA Innovation Award Finalist" Aug. 30, 2017, retrieved from Internet from Feb. 5, 2020. https://www.draper.com/news-releases/perceptive-robot-earns-draper-spot-kuka-innovation-award-finalist.
"Draper Spins Out Dexai Robotics", Mar. 21, 2019, retrieved from Internet from Feb. 5, 2020. https://www.draper.com/news-releases/draper-spins-out-dexai-robotics.
Dynamic Robotic Manipulation—KUKA Innovation—Finalist Spotlight—Apr. 26, 2018 retrieved from Internet Feb. 5, 2020. https://youtube.com/watch?v=7wGc-4uqOKw.
Siciliano, B., et al. "Chapter 8—Motion Control—Robotics Modelling Planning and Control", In: Robotics Modelling Planning and Control, Dec. 23, 2009.
Siciliano, B., et al. "Chapter 9—Force Control—Robotics Modelling Planning and Control", In: Robotics Modelling Planning and Control, Dec. 23, 2009.
International Search Report and Written Opinion for PCT/US2019/051040 dated Feb. 7, 2020 entitled "Manipulating Fracturable and Deformable Materials Using Articulated Manipulators".
International Search Report and Written Opinion for PCT/US2019/051180 dated Jan. 31, 2020 entitled "One-Click Robot Order".
Olin College of Engineering, "Autonomous Tool Changer" Draper 2016-2017, retrieved from Internet Feb. 5, 2020. http://www.olin.edu/sites/default/files/draperarchival2.pdf.
Olin College of Engineering, Autonomous Tool Changer, MoMap and the Future, "How Can We Enable a Robotic Arm to Change and Use Human Tools Autonomously". Date unknown.
International Search Report and Written Opinion for PCT/US2019/051061 dated Apr. 2, 2020 entitled "Controlling Robot Torque and Velocity Based on Context".
International Search Report and Written Opinion for PCT/US2019/051067 dated Jan. 16, 2020 entitled "Robot Interaction With Human Co-Workers".
Yang et al., "Obstacle Avoidance through Deep Networks based Intermediate Perception", Apr. 27, 2017, The Robotics Instiute, Carnegie Mellon University (Year: 2017).
Feddema, John T., et al., Model-Based Visual Feedback Control for a Hand-Eye Coordinated Robotic System, Aug. 1992, IEEE, vol. 25, Issue: 8, pp. 21-31 (Year: 1992).
Charabaruk, Nicholas; "Development of an Autonomous Omnidirectional Hazardous Material Handling Robot";. University of Ontario Institute of Technology (Canada). ProQuest Dissertations Publishing, 2015. 10006730. (Year: 2015).
Langsfeld, Joshua D.; "Learning Task Models for Robotic Manipulation of Nonrigid Objects"; University of Maryland, College Park. ProQuest Dissertations Publishing, 2017. 10255938. (Year: 2017).
Rennekamp, T., et al., "Distributed Sensing and Prediction of Obstacle Motions for Mobile Robot Motion Planning," 2006, IEEE, International Conference on Intelligent Robots and Systems, pp. 4833-4838 (Year: 2006).

\* cited by examiner

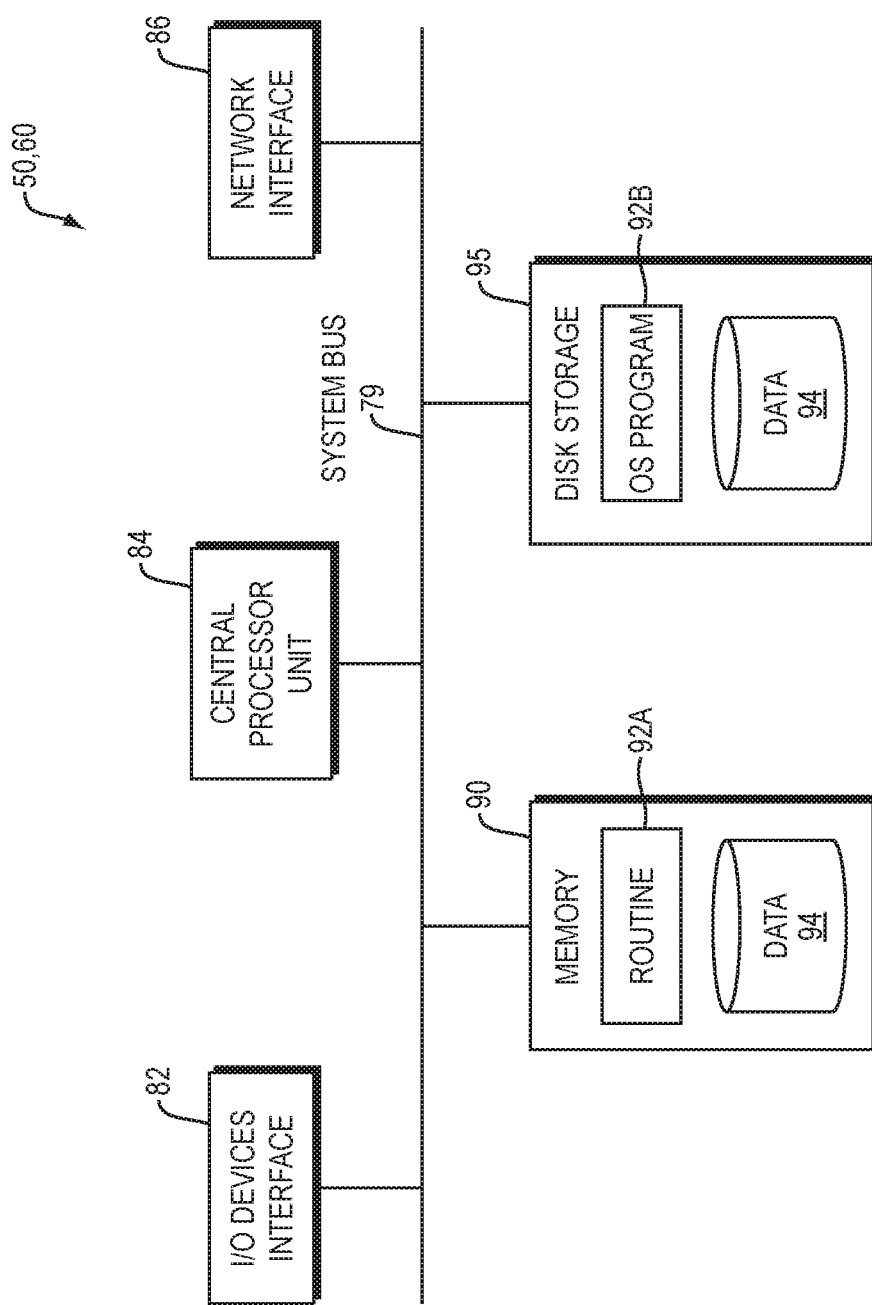

ONE-CLICK ROBOT ORDER

RELATED APPLICATIONS

This application claims the benefit of U.S. Provisional Application No. 62/730,703, filed on Sep. 13, 2018, U.S. Provisional Application No. 62/730,947, filed on Sep. 13, 2018, U.S. Provisional Application No. 62/730,933, filed on Sep. 13, 2018, U.S. Provisional Application No. 62/730,918, filed on Sep. 13, 2018, U.S. Provisional Application No. 62/730,934, filed on Sep. 13, 2018 and U.S. Provisional Application No. 62/731,398, filed on Sep. 14, 2018.

This application is related to U.S. patent application Ser. No. 16/570,100, U.S. patent application Ser. No. 16/570,855, U.S. patent application Ser. No. 16/570,955, U.S. patent application Ser. No. 16/571,003, U.S. patent application Ser. No. 16/570,915, U.S. patent application Ser. No. 16/570,976, U.S. patent application Ser. No. 16/570,736, U.S. patent application Ser. No. 16/571,025, U.S. patent application Ser. No. 16/570,606, and U.S. patent application Ser. No. 16/571,040, all filed on the same day, Sep. 13, 2019.

The entire teachings of the above applications are incorporated herein by reference.

BACKGROUND

Traditionally, the food industry employs human labor to manipulate ingredients with the purpose of either assembling a meal such as a salad or a bowl, or packing a box of ingredients such as those used in grocery shopping, or preparing the raw ingredients. Robots have not yet been able to assemble complete meals from prepared ingredients in a food-service setting such as a restaurant, largely because the ingredients are arranged unpredictably and change shape in difficult-to-predict ways rendering traditional methods to move material ineffective without extensive modifications to existing kitchens. Additionally, traditional material handling methods are ill-suited to moving cooked foods without altering their texture and taste-profile. These difficulties arise because the friction, stiction, and viscosity of commonly consumed foods cause auger, conveyor, and suction mechanisms to become clogged and soiled, while these mechanisms simultaneously impart forces on the foodstuffs which alter their texture, consistency, and taste-profile in unappetizing ways.

SUMMARY

Menus list a number of menu items, which can be meals, appetizers, snacks, etc., each of which include one or more ingredient. To create the menu items, recipes should be followed. For example, a set of raw ingredients undergo a series of process steps to form an ingredient, and a quantity of each ingredient should be assembled to follow the recipe for the menu item. Additionally, the ingredients are located in specific locations, and need to be transported to a meal assembly area. Each individual ingredient should be handled with a specific utensil type, and an allergen free utensil to properly move and manipulate the ingredient for proper assembly into the menu item.

In non-automated environments, a human staff member collects and manipulates the ingredients to assemble menu items. However, in an embodiment of the present disclosure, an autonomous system can automatically assemble a menu item. The present invention relates to a computer and robot method and system for placing an order and, more particularly, to a method and system for ordering items in person and over the internet for robotic assembly.

A user places an order for purchase at a system, and a server-side system receives the order. The server-side system identifies the menu item(s) in the order and further identifies the ingredient(s) inside each order and its portion size. At a location with meal assembling robots, utensils, and ingredients, robot(s) identify ingredients and utensils in its location/environment. Based on the available utensils, the server-side system determines the materials to add and actions necessary to add those material to complete the ordered menu items in the requested portion size. For example, a 2-ounce portion of rice can be fulfilled with two scoops from a 1-ounce spoon. The server-side system interpolates the ingredients, utensils, ingredient location, and utensils location to determine an optimal movement trajectory to sequence an order of ingredient assembly for faster completion speeds. When multiple orders are made, robot trajectories can be further accelerated by combining multiple order instructions and optimizing the ingredient assembly sequence and utensil-use sequence. For example, scoops of the same ingredient with the same utensil can be performed in sequence across multiple menu items, or multiple orders to avoid the time spent exchanging tools for different utensil types and allergen free utensil required for each ingredient.

The resulting individual order is assembled when it contains all of the menu items in the user's order placed at initial system, and each of the menu items contains all of the required ingredients as determined by the recipe and any allowed substitutions.

An embodiment of the present invention provides a method and system for ordering menu items from a system. The system displays items for the user to select at a user-side system. The server-side system receives these item requests (e.g., the order) and identifies the ingredients/materials necessary to create the items as enumerated in recipes. The server-side system determines the portion size from the recipe and any user-supplied modifiers (e.g., extra chicken, no olives, etc.) and the necessary utensils required to manipulate desired ingredient as determined by the robot which is able to manipulate that ingredient. The server system further uses computer vision to identify the location of ingredients and utensils. These variables are used to compute a trajectory with low completion time that gathers the ingredient required for the recipe with high probability. These trajectories are executed by robot(s) to assemble the final menu item. As orders increase, trajectory completion time can be further decreased by combining the assembly of multiple items and having trajectories with minimized redundant movements.

In an embodiment, a method for handling an order includes determining a plurality of ingredients based on an order, received from a user over a network, for a location having a plurality of robots. The method further includes planning at least one trajectory for at least one robot based on the plurality of ingredients and utensils available at the location, and proximity of each ingredient and utensil to the at least one robot. Each trajectory can be configured to move one of the plurality of ingredients into a container associated with the order. In an embodiment, the method includes executing the at least one trajectory by the at least one robot to fulfill the order. In an embodiment, the method includes moving the container to a pickup area.

In an embodiment, the method includes, based on the location selected by the user, determining available utensils and available ingredients at the location. The method further includes determining recipe availability based on the available utensils and available ingredients. The method further includes displaying menu items based on recipe availability determined.

The method further includes after executing a first of the at least one trajectories by a first robot, moving the container into a working area of a second robot. The method further includes executing a second of the at least one trajectories by a second robot.

The method further includes determining the location based on a user's location and wait times at each of a plurality of candidate locations. The method can also include determining the location further based on distance to each of the plurality of candidate locations, and traffic to each of the plurality of candidate locations.

In an embodiment, the order is a first order, and determining the plurality of ingredients is further based on the first order and a second order. Planning the at least one trajectory for at least one robot can be further based on the plurality of ingredients from the first order and the second order.

In an embodiment, a system for placing an order includes a processor and a memory with computer code instructions stored thereon. The processor and the memory, with the computer code instructions, are configured to cause the system to determine a plurality of ingredients based on an order, received from a user over a network, for a location having a plurality of robots. The computer code instructions are further configured to cause the system to plan at least one trajectory for at least one robot based on the plurality of ingredients and utensils available at the location, and proximity of each ingredient and utensil to each of the at least one robots. Each trajectory is configured to move one of the plurality of ingredients into a container associated with the order of the user. The computer code instructions are further configured to execute the at least one trajectory by the at least one robot to fulfill the order. The computer code instructions are further configured to move the container in a pickup area.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 5 is a diagram of an example internal structure of a computer (e.g., client processor/device or server computers) in the computer system of FIG. 4.

DETAILED DESCRIPTION

A description of example embodiments follows.

Operating a robot in a food preparation environment, such as a quick service restaurant, can be challenging for several reasons. First, the end effectors (e.g., utensils), that the robot uses need to remain clean from contamination. Contamination can include allergens (e.g., peanuts), dietary preferences (e.g., contamination from pork for a vegetarian or kosher customer), dirt/bacteria/viruses, or other non-ingestible materials (e.g., oil, plastic, or particles from the robot itself). Second, the robot should be operated within its design specifications, and not exposed to excessive temperatures or incompatible liquids, without sacrificing cleanliness. Third, the robot should be able to manipulate food stuffs, which are often fracturable and deformable materials, and further the robot must be able to measure an amount of material controlled by its utensil in order to dispense specific portions. Fourth, the robot should be able to automatically and seamlessly switch utensils (e.g., switch between a ladle and salad tongs). Fifth, the utensils should be adapted to be left in an assigned food container and interchanged with the robot as needed, in situ. Sixth, the interchangeable parts (e.g., utensils) should be washable and dishwasher safe. Seventh, the robot should be able to autonomously generate a task plan and motion plan(s) to assemble all ingredients in a recipe, and execute that plan. Eighth, the robot should be able to modify or stop a motion plan based on detected interference or voice commands to stop or modify the robot's plan. Ninth, the robot should be able to minimize the applied torque based on safety requirements or the task context or the task parameters (e.g., density and viscosity) of the material to be gathered. Tenth, the system should be able to receive an electronic order from a user, assemble the meal for the user, and place the meal for the user in a designated area for pickup automatically with minimal human involvement.

Figure 1A:
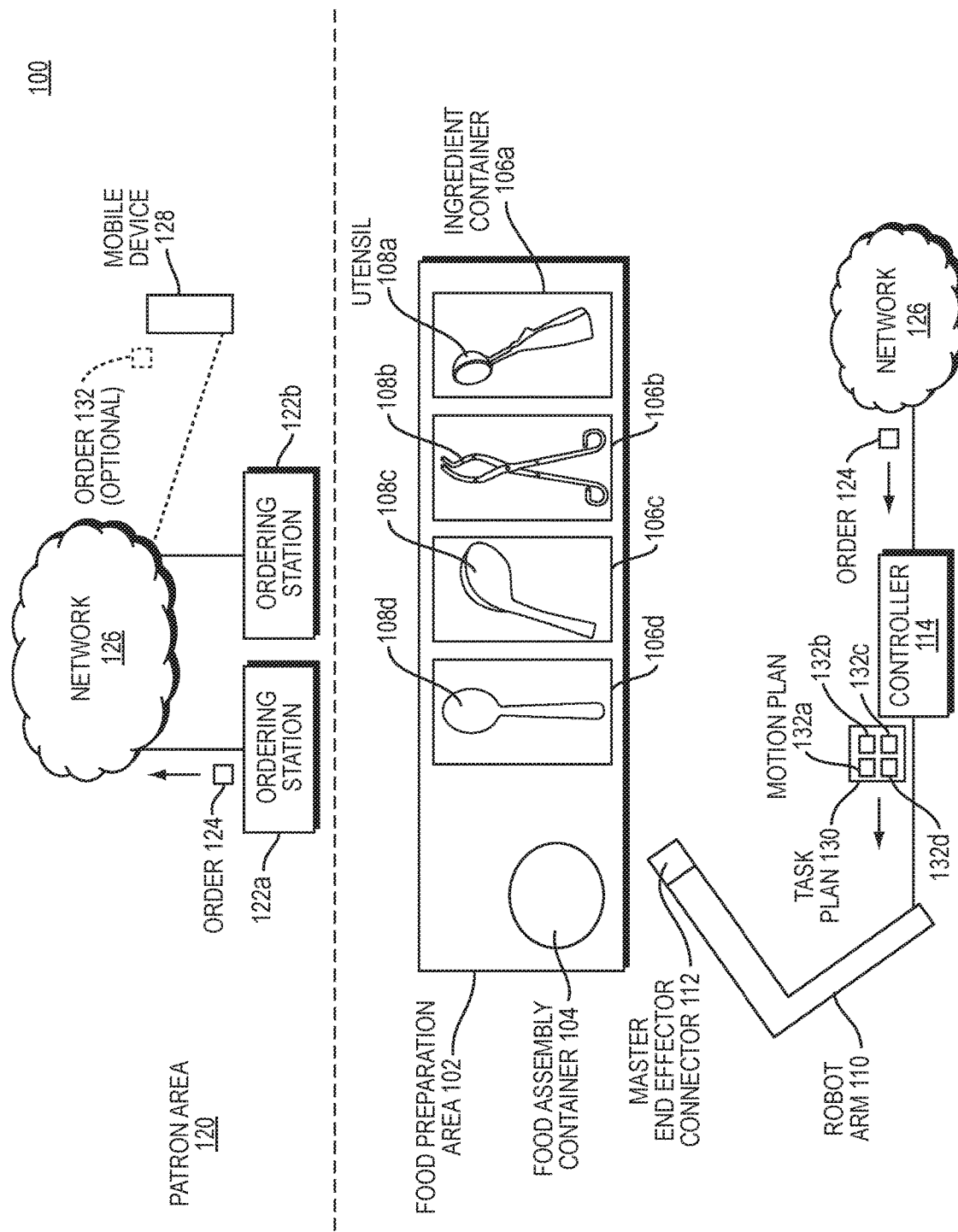
FIG. 1A is a block diagram illustrating an example embodiment of a quick service food environment of embodiments of the present disclosure.

FIG. 1A is a block diagram illustrating an example embodiment of a quick service food environment 100 of embodiments of the present disclosure. The quick service food environment 100 includes a food preparation area 102 and a patron area 120.

The food preparation area 102 includes a plurality of ingredient containers 106a-d each having a particular foodstuff (e.g., lettuce, chicken, cheese, tortilla chips, guacamole, beans, rice, various sauces or dressings, etc.). Each ingredient container 106a-d stores in situ its corresponding ingredients. Utensils 108a-d may be stored in situ in the ingredient containers or in a stand-alone tool rack 109. The utensils 108a-d can be spoons, ladles, tongs, dishers (scoopers), spatulas, or other utensils. Each utensil 108a-e is configured to mate with and disconnect from a tool changer interface 112 of a robot arm 110. While the term utensil is used throughout this application, a person having ordinary skill in the art can recognize that the principles described in relation to utensils can apply in general to end effectors in other contexts (e.g., end effectors for moving fracturable or deformable materials in construction with an excavator or backhoe, etc.); and a robot arm can be replaced with any computer controlled actuatable system which can interact with its environment to manipulate a deformable material. The robot arm 110 includes sensor elements/modules such as stereo vision systems (SVS), 3D vision sensors (e.g., Microsoft Kinect™ or an Intel RealSense™), LIDAR sensors, audio sensors (e.g., microphones), inertial sensors (e.g., internal motion unit (IMU), torque sensor, weight sensor, etc.) for sensing aspects of the environment, including pose (i.e., X, Y, Z coordinates and roll, pitch, and yaw angles) of tools for the robot to mate, shape and volume of foodstuffs in ingredient containers, shape and volume of foodstuffs deposited into food assembly container, moving or static obstacles in the environment, etc.

To initiate an order, a patron in the patron area 120 enters an order 124 in an ordering station 122*a-b*, which is forwarded to a network 126. Alternatively, a patron on a mobile device 128 can, within or outside of the patron area 120, generate an optional order 132. Regardless of the source of the order, the network 126 forwards the order to a controller 114 of the robot arm 110. The controller generates a task plan 130 for the robot arm 110 to execute.

The task plan 130 includes a list of motion plans 132*a-d* for the robot arm 110 to execute. Each motion plan 132*a-d* is a plan for the robot arm 110 to engage with a respective utensil 108*a-e*, gather ingredients from the respective ingredient container 106*a-d*, and empty the utensil 108*a-e* in an appropriate location of a food assembly container 104 for the patron, which can be a plate, bowl, or other container. The robot arm 110 then returns the utensil 108*a-e* to its respective ingredient container 106*a-d*, the tool rack 109, or other location as determined by the task plan 130 or motion plan 132*a-d*, and releases the utensil 108*a-d*. The robot arm executes each motion plan 132*a-d* in a specified order, causing the food to be assembled within the food assembly container 104 in a planned and aesthetic manner.

Within the above environment, various of the above described problems can be solved. The environment 100 illustrated by FIG. 1 can improve food service to patrons by assembling meals faster, more accurately, and more sanitarily than a human can assemble a meal. Some of the problems described above can be solved in accordance with the disclosure below.

Figure 1B:
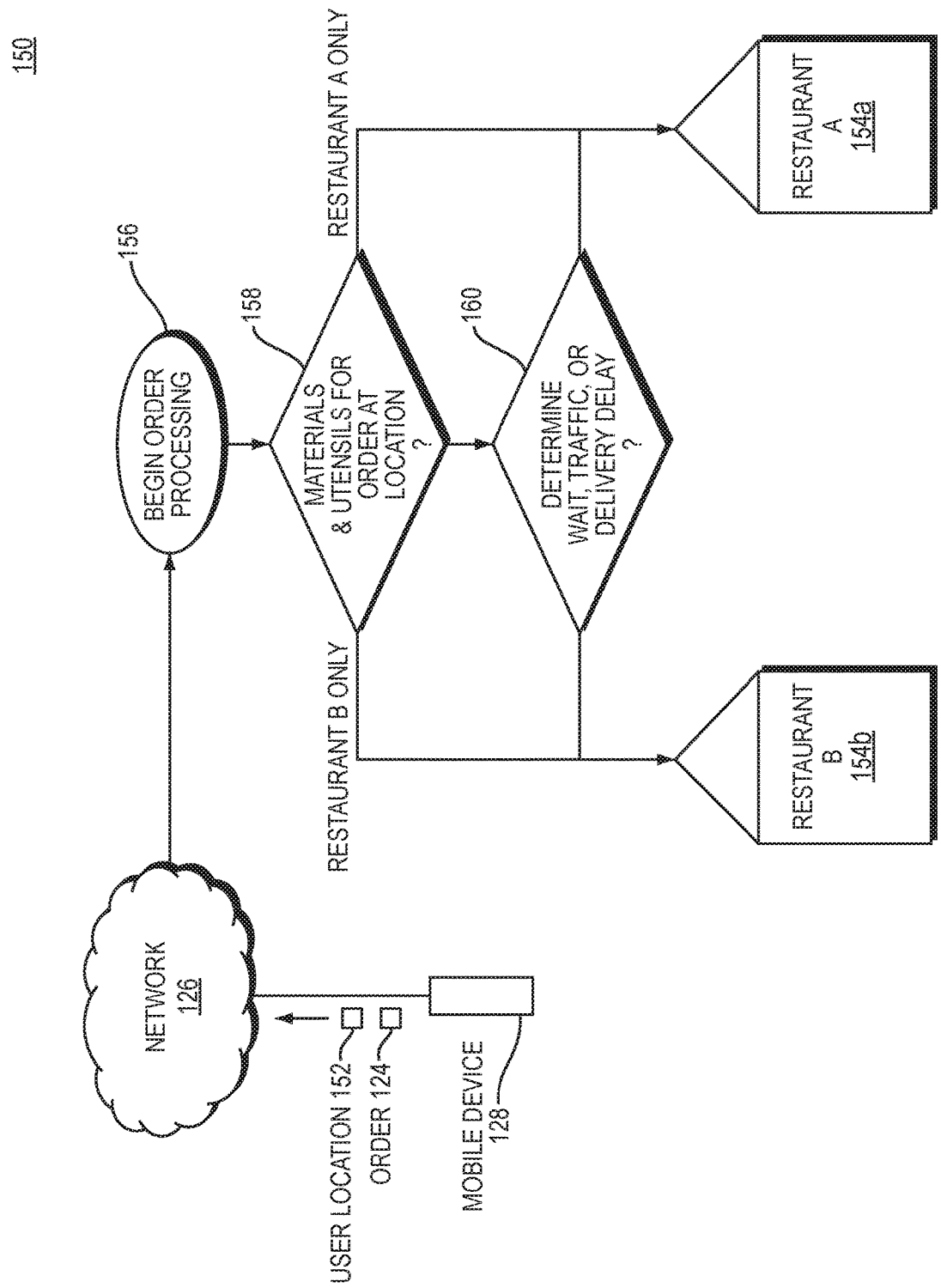
FIG. 1B is a block diagram illustrating an example embodiment of the present disclosure.

FIG. 1B is a block diagram 150 illustrating an example embodiment of the present disclosure. An order 124 and user location 152 are forwarded to a network 126 by a mobile device 128, which begins order processing 156. The order processing determines 158 materials and utensils for the order 124 at locations near the user's locations 152. If the materials and utensils for the order 124 are only available at Restaurant A 154*a* and B 154*b*, the order is routed to Restaurant A 154*a* and B 154*b*, respectively. If both have the required materials, then the method determines 160 the wait time at, traffic to, delivery delay of, or a combination of those factors, and routes the order to a best location based on those factors.

Figure 2:
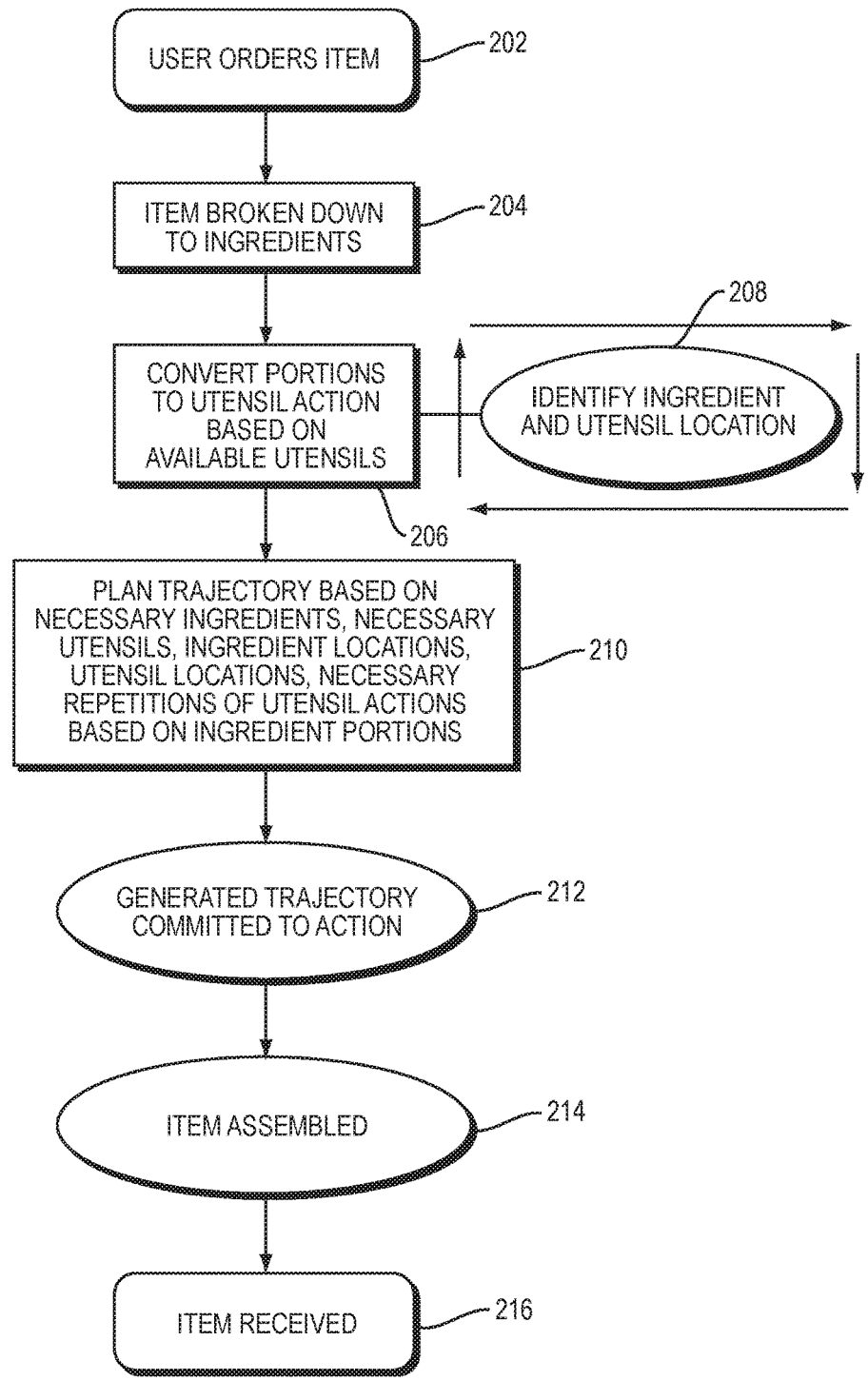
FIG. 2 is a flow diagram illustrating an example process employed by the present disclosure.
Figure 2:
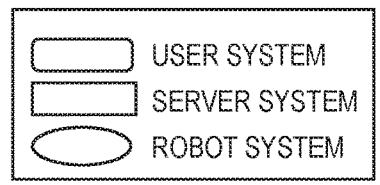

FIG. 2 is a flow diagram 200 illustrating an example process employed by the present disclosure. First, a user orders an item (202). The item is broken down into ingredients (204). The process then converts portions in the recipe to utensil actions based on available utensils at a location (206). In tandem, the process identifies ingredient and utensil location in a continuation manner (208). Then, the process plans a trajectory based on necessary ingredients, necessary utensils, ingredient locations, utensil locations, and necessary repetitions of utensil actions based on ingredient portions (210). The process generates a trajectory committed to action (212). The process assembles the item (214) and the items are received by the user (216).

Figure 3:
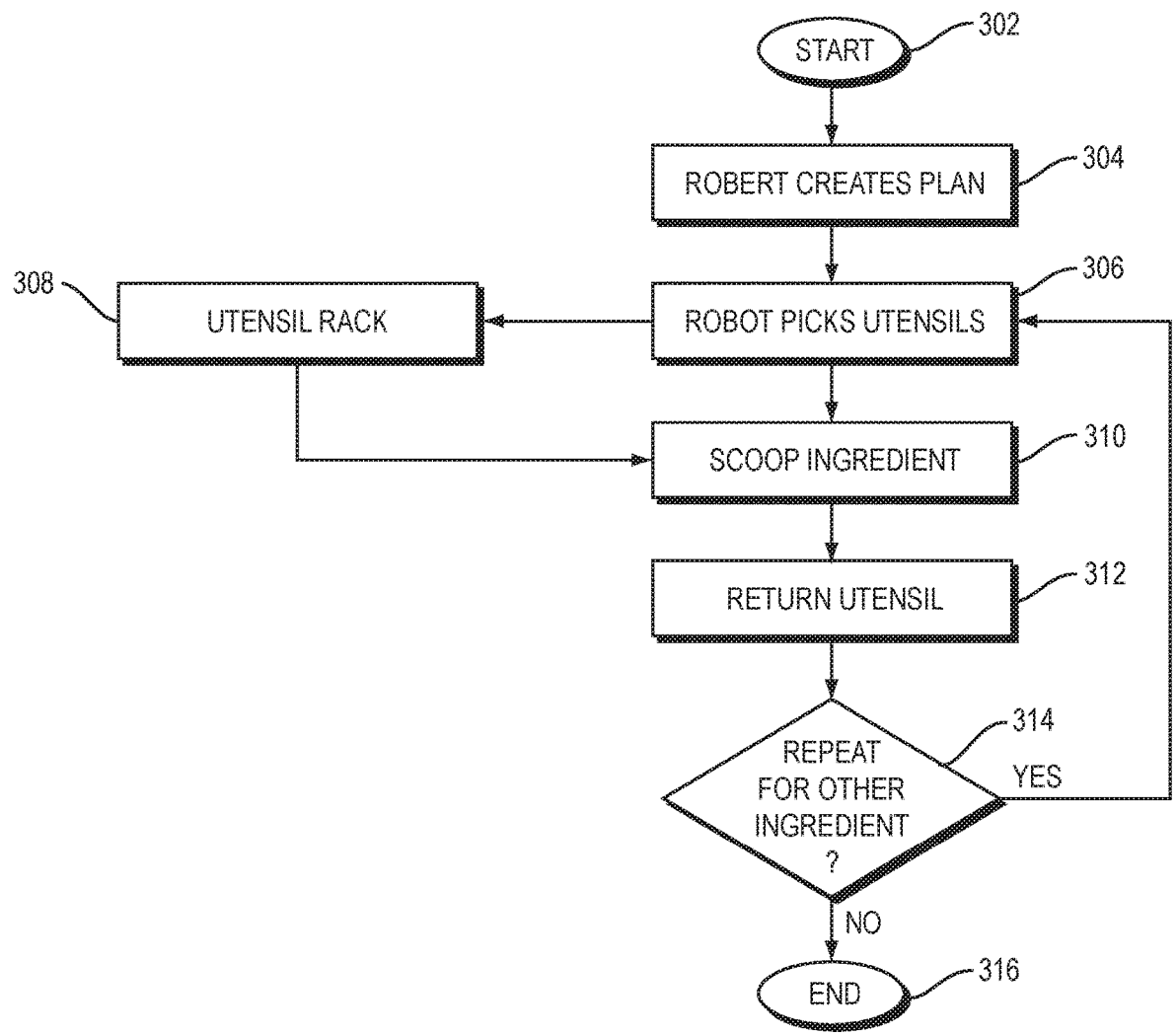
FIG. 3 is a flow diagram illustrating an example embodiment of a process employed by the present disclosure.

FIG. 3 is a flow diagram 300 illustrating an example embodiment of a process employed by the present disclosure. After the process starts (302), the robot creates a plan to fulfill an order at location (304). The robot further picks utensils (306) and monitors a utensil rack for their locations (308). The robot then manipulates (e.g., scoops, grabs, cuts) an ingredient from the recipe of the order (310). After placing the ingredient in the food preparation area in a given configuration, the robot returns the utensil (312). If more ingredients are needed (314), the robot picks another utensil (306). Otherwise, the robot ends the process (316).

A person having ordinary skill in the art can recognize that the robot can further parallelize orders by gathering multiple units of the same ingredient for different orders, or using the same utensil across orders to save time from switching the end-effector of the robot. This requires the robot being able to reach each container for the different orders and pass the container to the next process step. This may be accomplished by a conveyor belt, the robot performing the picking, or an additional robot.

Figure 4:
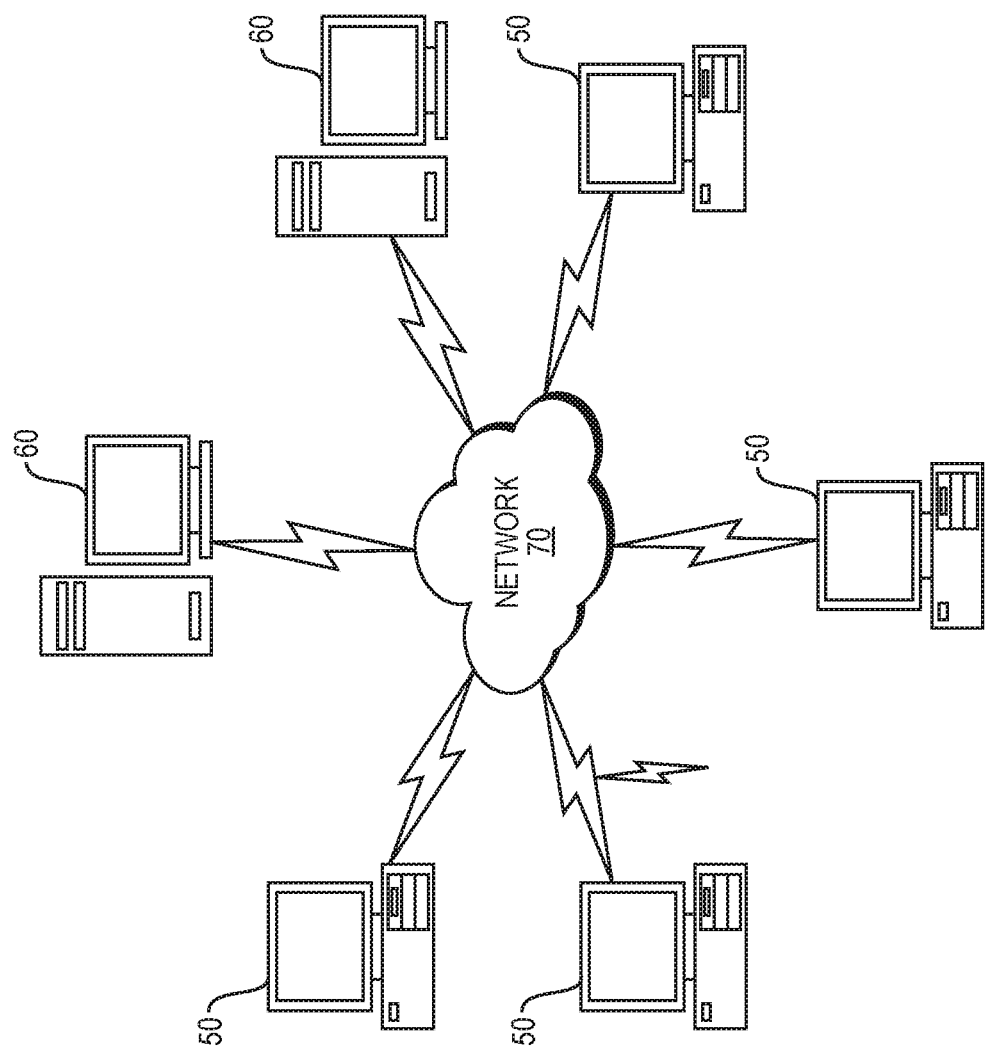
FIG. 4 illustrates a computer network or similar digital processing environment in which embodiments of the present invention may be implemented.

FIG. 4 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

FIG. 5 is a diagram of an example internal structure of a computer (e.g., client processor/device 50 or server computers 60) in the computer system of FIG. 4. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., structure generation module, computation module, and combination module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method for handling an order, the method comprising:
    determining a plurality of ingredients based on an order, received from a user over a network, for a location having a plurality of robots;
    planning at least one trajectory for at least one robot arm of at least one robot of the plurality of robots based on the plurality of ingredients and utensils available at the location, and proximity of each ingredient and utensil to the at least one robot, each trajectory configured to move deformable or fracturable materials of one of the plurality of ingredients into a container associated with the order after connecting each respective utensil to the robot arm;
    executing the at least one trajectory by the at least one robot arm of the at least one robot to fulfill the order;
    moving the container to a pickup area.

2. The method of claim 1, further comprising:
    based on the location selected by the user, determining one or more of available utensils and available ingredients at the location;
    determining recipe availability based on the available utensils and available ingredients; and
    displaying menu items based on recipe availability determined.

3. The method of claim 1, further comprising:
    after executing a first of the at least one trajectories by a first robot, moving the container into a working area of a second robot; and
    executing a second of the at least one trajectories by a second robot.

4. The method of claim 1, further comprising:
    determining the location based on a user's location and wait times at each of a plurality of candidate locations.

5. The method of claim 4, further comprising:
    determining the location further based on distance to each of the plurality of candidate locations, and traffic to each of the plurality of candidate locations.

6. The method of claim 1, wherein the order is a first order, and wherein:
    determining the plurality of ingredients is further based on the first order and a second order.

7. The method of claim 6, wherein planning the at least one trajectory for at least one robot is further based on the plurality of ingredients from the first order and the second order.

8. A system for placing an order, the system comprising:
    a processor; and
    a memory with computer code instructions stored thereon, the processor and the memory, with the computer code instructions, being configured to cause the system to:
        determine a plurality of ingredients based on an order, received from a user over a network, for a location having a plurality of robots;
        plan at least one trajectory for at least one robot arm of at least one robot of the plurality of robots based on the plurality of ingredients and utensils available at the location, and proximity of each ingredient and utensil to each of the at least one robots, each trajectory configured to move deformable or fracturable materials of one of the plurality of ingredients into a container associated with the order of the user after connecting each respective utensil to the robot arm;
        execute the at least one trajectory by the at least one robot arm of the at least one robot to fulfill the order;
        move the container in a pickup area.

9. The system of claim 8, wherein the instructions are further configured to cause the processor to:
    based on the location selected by the user, determine one or more of available utensils and available ingredients at the location;
    calculate recipe availability based on the available utensils and available ingredients; and
    display menu items based on recipe availability calculated.

10. The system of claim 8, wherein the instructions are further configured to cause the processor to:
    after executing a first of the at least one trajectories by a first robot, move the container into a working area of a second robot; and
    execute a second of the at least one trajectories by a second robot.

11. The system of claim 8, wherein the instructions are further configured to cause the processor to:
    determine the location based on a user's location and wait times at each of a plurality of candidate locations.

12. The system of claim 11, wherein the instructions are further configured to cause the processor to:
    determine the location further based on distance to each of the plurality of candidate locations, and traffic to each of the plurality of candidate locations.

13. The system of claim 8, wherein the order is a first order, and wherein:
    determining the plurality of ingredients is further based on the first order and a second order.

14. The system of claim 13, wherein planning the at least one trajectory for at least one robot is further based on the plurality of ingredients from the first order and the second order.

* * * * *